United States Patent [19]
Braun et al.

[11] Patent Number: 5,264,789
[45] Date of Patent: Nov. 23, 1993

[54] METHOD OF DETERMINING THE DIRECTION OF ROTATION OF A MEMBER USING A ROTOR HAVING A PREDETERMINED PATTERN OF EXCITER SURFACES

[75] Inventors: Eugene R. Braun, Royal Oak; Joseph H. McNinch, Jr., Livonia, both of Mich.

[73] Assignee: Eaton Corporation, Cleveland, Ohio

[21] Appl. No.: 919,446

[22] Filed: Jul. 27, 1992

[51] Int. Cl.⁵ ............................ G01P 13/04; G01P 3/44
[52] U.S. Cl. ............................... 324/165; 324/166; 324/207.22; 324/207.25; 340/672; 341/6; 364/565
[58] Field of Search .............. 324/165, 166, 173, 174, 324/175, 207.22, 207.25; 340/672; 364/565, 566; 310/168; 341/6, 15; 180/338

[56] References Cited
U.S. PATENT DOCUMENTS

| | | | |
|---|---|---|---|
| 3,728,565 | 4/1973 | O'Callaghan | 310/168 |
| 3,930,201 | 12/1975 | Ackermann et al. | 340/672 X |
| 4,142,153 | 2/1979 | Smith | 324/165 |
| 4,262,251 | 4/1981 | Fujishiro et al. | 324/166 X |
| 4,331,917 | 5/1982 | Render et al. | 324/166 |
| 4,356,447 | 10/1982 | Honig et al. | 324/173 X |
| 4,370,614 | 1/1983 | Kawada et al. | 324/173 |
| 4,760,827 | 8/1988 | Schreiber et al. | 324/173 X |
| 4,972,332 | 11/1990 | Luebbering et al. | 340/672 X |
| 5,086,272 | 2/1992 | Hinrichsen | 340/672 X |
| 5,095,269 | 3/1992 | McNinch, Jr. | 324/166 |

*Primary Examiner*—Gerard R. Strecker
*Attorney, Agent, or Firm*—L. J. Kasper

[57] ABSTRACT

A method of determining the direction of rotation of a member (17) is closed, wherein the member has a speed pick-up rotor (27) having a plurality of teeth or exciter surfaces (29). The rotor has a predetermined pattern of gaps (37,73) and groups of teeth, each group of teeth having a number of teeth which is different than the number in any other group. As the rotor rotates, the pattern of gaps and teeth is sensed, and compared to a predetermined pattern. Depending upon the results of the comparison, the logic generates either a signal (61) representing clockwise rotation, or a signal (65) representing counter-clockwise rotation.

15 Claims, 6 Drawing Sheets

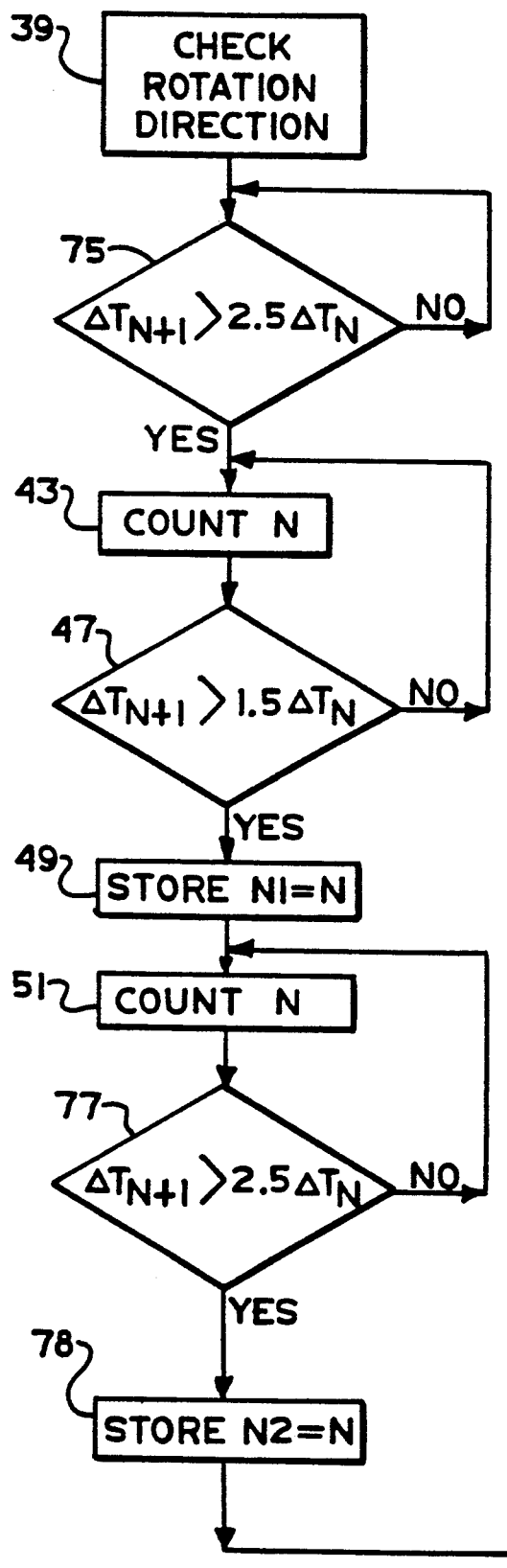
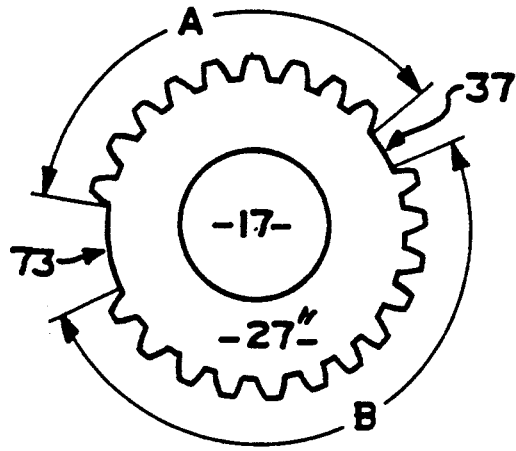
FIG. 6
FIG. 7
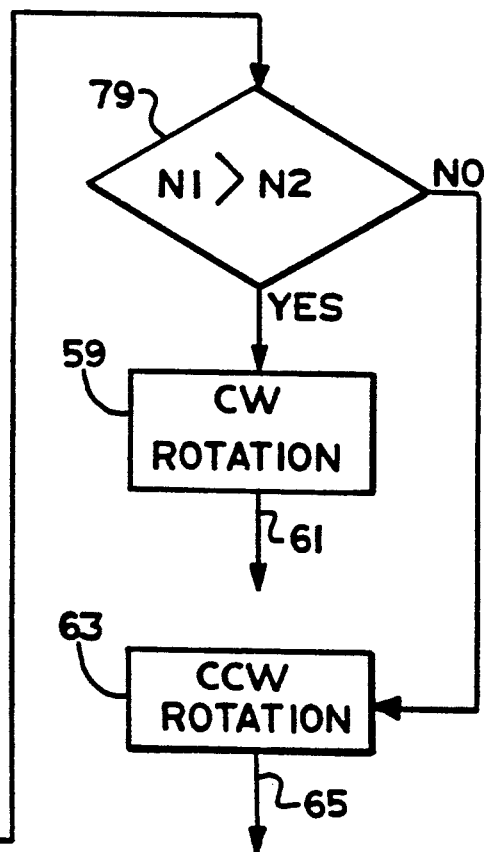

5,264,789

METHOD OF DETERMINING THE DIRECTION OF ROTATION OF A MEMBER USING A ROTOR HAVING A PREDETERMINED PATTERN OF EXCITER SURFACES

BACKGROUND OF THE DISCLOSURE

The present invention relates to a method of determining the direction of rotation of a member, such as a rotating shaft, and more particularly, to a speed pick-up wheel or rotor which is adapted to be mounted on the rotating shaft.

In a typical system of the type with which the present invention may be utilized, it is the intention to sense both speed of rotation and direction of rotation, of the rotating member. However, a number of generally acceptable methods, devices, and logic circuits are already known for use in determining the speed of rotation, and therefore, the description of the present invention will focus almost entirely on determining the direction of rotation of the rotating member.

As is well known to those skilled in the art, most methods and devices for determining speed and direction of rotation of a member, such as a shaft, involve positioning on the shaft some sort of a pick-up wheel or rotor, which typically is a gear wheel having a plurality of teeth about its outer periphery, circumferentially equally spaced apart.

One known method for sensing direction of rotation involves modifying the profile of the teeth on the rotor in such a way that the resulting signal, as the tooth passes in close proximity to a sensor, has a different shape if the shaft is rotating clockwise than if the shaft is rotating counter-clockwise. For example, it is known to provide teeth on such a rotor having a "saw-tooth" configuration, whereby the amplitude of the resulting signal will increase gradually, then drop sharply in one direction of rotation, but will increase sharply then drop gradually in the other direction of rotation. Although such a tooth configuration conceptually provides an acceptable method of sensing direction of rotation, the necessity of sensing one wave form versus another adds substantially to the complexity of the required logic system, and introduces a substantially greater opportunity for error.

A substantially different approach to sensing direction of rotation is to provide two different sensors, each of which has a sinusoidal signal produced thereon, in response to the rotation of the rotor, with the sensors being positioned to result in phased signals, for example, where one signal leads the other by 90°. Such an approach to detecting direction of rotation is illustrated in U.S. Pat. Nos. 3,728,565; 4,331,917; and 4,370,614. Utilizing such an approach has the advantage of greater accuracy in sensing direction of rotation, but the necessity for two separate sensors, and the additional logic circuitry adds substantially to the complication and expense of both the system hardware and software.

SUMMARY OF THE INVENTION

Accordingly, it is an object of the present invention to provide an improved method of determining the direction of rotation of a member, the method being both accurate and structurally simple, and not adding substantially to the required logic circuitry.

It is a more specific object of the present invention to provide such an improved method wherein the toothed rotor is provided with some sort of tooth and gap pattern which may be sensed to determine direction of rotation.

The above and other objects of the present invention are accomplished by the provision of a method of determining the direction of rotation of a member having a speed pick-up rotor associated therewith. The rotor is of the type provided with a plurality of circumferentially spaced-apart rotor exciter surfaces adapted to be sensed by a sensor assembly of the type adapted to generate a predetermined signal in response to the proximal passing of a rotor exciter surface.

The method comprises the steps of:

(a) providing the speed pick-up rotor with a predetermined pattern of gaps and groups of exciter surfaces, each group of exciter surfaces having a number of exciter surfaces which is different than the number in any other group;

(b) sensing, as the rotor rotates, the passing of one of the gaps and comparing the gap to a known gap;

(c) sensing, as the rotor rotates, the passing of each exciter surface within at least one group immediately following the sensed gap, and counting the number of the exciter surfaces within that group; and (d) comparing the pattern of the one gap and the exciter surfaces to the predetermined pattern, and, if the patterns are the same, generating a first signal representative of clockwise rotation of the member, and, if the patterns are not the same, generating a signal representative of counter-clockwise rotation of the member.

BRIEF DESCRIPTION OF THE DRAWINGS

FIG. 6 is a view similar to FIG. 2, illustrating another alternative embodiment of the rotor.

FIG. 7 is a flow chart illustrating the embodiment of the method to be used in conjunction with the rotor of FIG. 6.

DESCRIPTION OF THE PREFERRED EMBODIMENTS

Figures 1, 2:
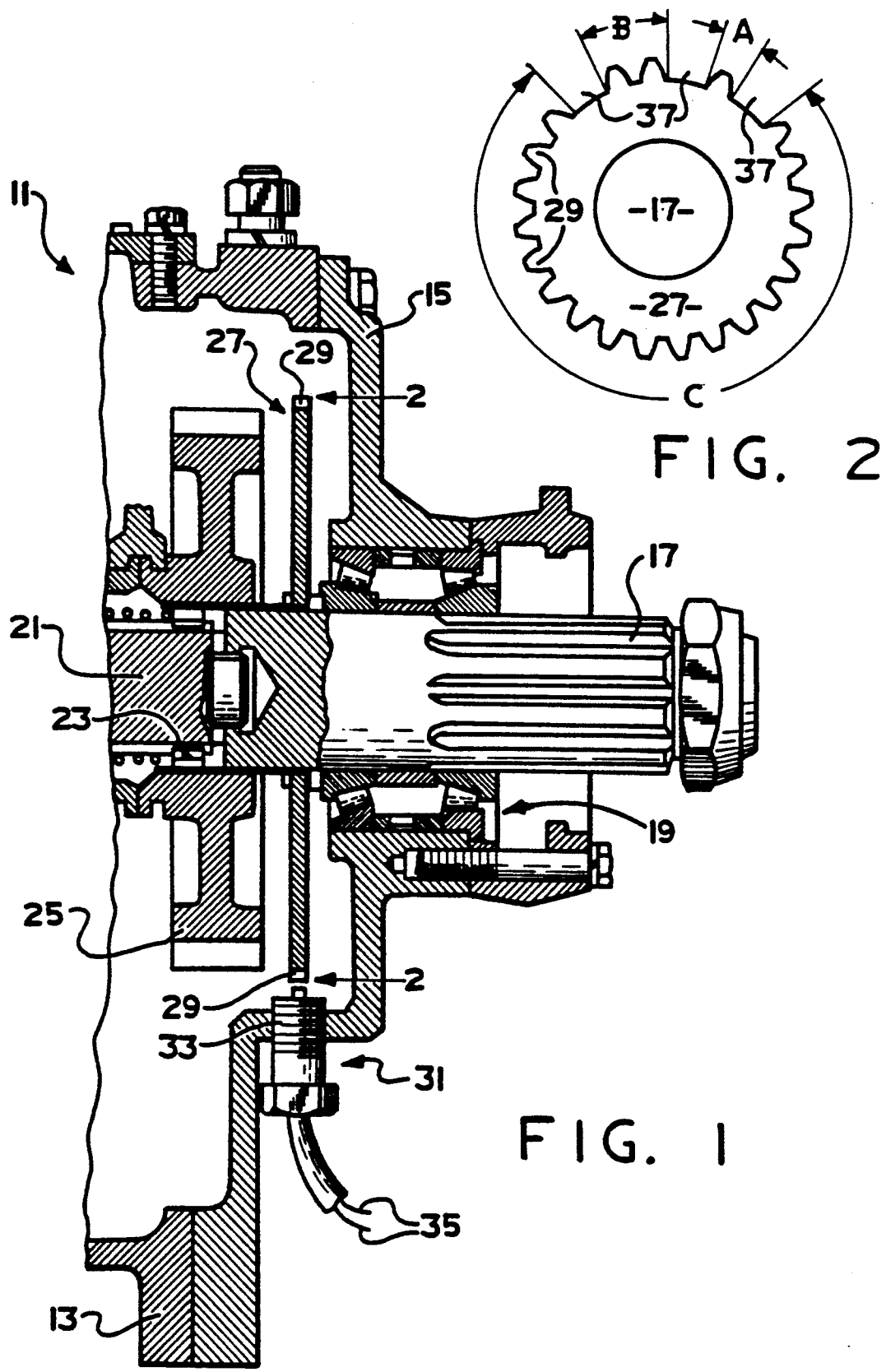
FIG. 1 is a fragmentary, axial cross-section of a rearward portion of a change-speed transmission of the type with which the present invention may be utilized.
FIG. 2 is a view taken on line 2—2 of FIG. 1, and illustrating, somewhat schematically, one embodiment of the rotor used in the method of the present invention.

Referring now to the drawings, which are not intended to limit the invention, FIG. 1 is a fragmentary, axial cross-section of the rearward portion of a change-speed transmission of the type illustrated and described in greater detail in U.S. Pat. No. 4,290,515, assigned to the assignee of the present invention and incorporated herein by reference.

The transmission, generally designated 11, includes a main transmission housing 13, and an end cover 15. The end cover surrounds an output shaft 17, with an arrangement of tapered roller bearings 19 being disposed radially between the shaft 17 and the end cover 15.

A forward end of the output shaft 17 receives a pilot portion defined by a main shaft 21. A clutch collar 23 is in toothed engagement with both the main shaft 21 and with internal teeth defined by a main shaft gear 25, the gear 25 also being in toothed engagement with the output shaft 17. Thus, it may be seen that the speed of rotation of the main shaft gear 25 and output shaft 17 comprise the output speed of the transmission 11.

Also disposed in toothed engagement with the output shaft 17 is a rotor 27 having a plurality of teeth 29 disposed about the periphery thereof, although those skilled in the art will understand that the present invention is not limited to any particular type of engagement between the output shaft 17 and the rotor member 27. The pattern of the teeth 29 on the rotor 27 comprises one important aspect of the present invention, and will be described in greater detail subsequently.

Referring still to FIG. 1, in threaded engagement with the end cover 15 is an electromagnetic pick-up device 31, which may be of the general type illustrated and described in U.S. Pat. No. 3,719,841, incorporated herein by reference. The pick-up device 31 may include a pole piece 33, including a radially-inward portion thereof disposed in close proximity to the teeth 29. A pair of suitable electric lead wires 35 are able to transmit, to the logic circuitry to be described subsequently, a signal generated in the pick-up device 31 in response to the rotation of the rotor 27 and the proximal passing of the teeth 29.

It should be clearly understood that the particular type of pick-up device used herein is not an essential feature of the present invention, nor is the particular structure of the pick-up device, nor the particular type of signal generated and transmitted to the logic circuitry. All that is essential to the present invention is that there be some suitable pick-up device disposed in operable proximity to the rotor 27 and able to sense the proximal passing of a tooth 29, or a gap between adjacent teeth, and generate a signal, or a pulse, whereby it is possible to distinguish between a tooth and a gap.

It should also be understood by those skilled in the art that it is not an essential feature of the present invention that the rotor 27 be provided with gear teeth. It is essential only that the rotor be provided with a series of "exciter" surfaces disposed about the outer periphery of the rotor 27, and nominally disposed in a circumferentially equally spaced-apart pattern. This is referred to as a "nominal" pattern for reasons which will become apparent subsequently.

EMBODIMENT OF FIGS. 2 AND 3

Figure 3:
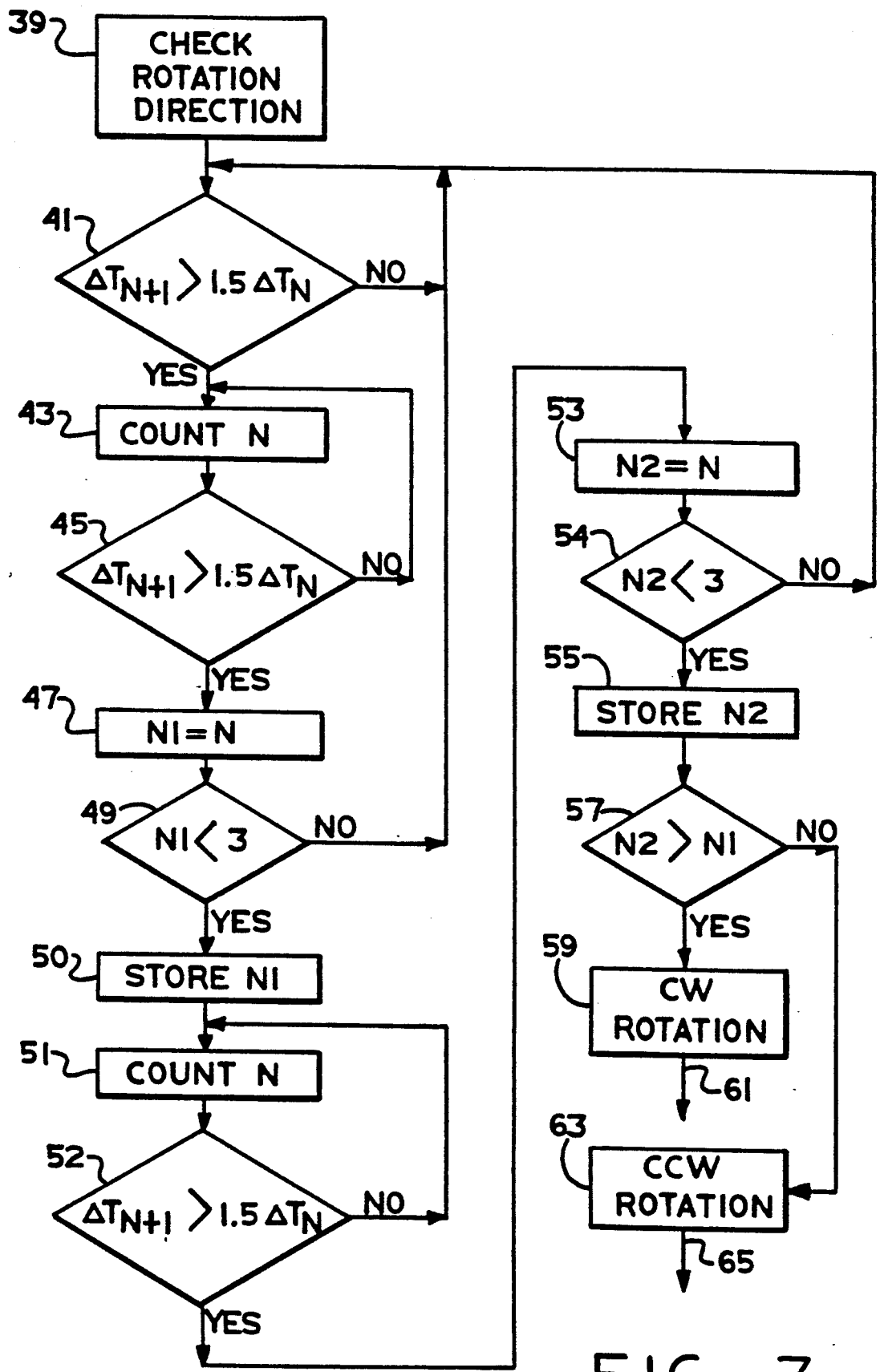
FIG. 3 is a flow chart illustrating the method of the present invention to be used in conjunction with the rotor of FIG. 2.

Referring now to FIGS. 2 and 3, FIG. 2 shows somewhat schematically the rotor 27, in which the teeth 29 are separated into three groups of teeth, the groups being designated A, B, and C. In the embodiment of FIG. 2, each of the groups A, B, and C is separated by a gap 37. Furthermore, in the embodiment of FIG. 2, the rotor 27 is designed nominally to have twenty-four teeth, which are circumferentially spaced-apart, and wherein each of the gaps 37, merely represents a tooth which has been eliminated. Therefore, in the rotor of FIG. 2, there is one tooth in group A, two teeth in group B, and eighteen teeth in group C which, with the three gaps 37, account for all twenty-four of the nominal teeth.

Those skilled in the art will understand that the reference hereinabove to the gaps 37 comprising teeth which are "eliminated" will preferably mean that the rotor 27 could be a forged gear, or else could be a gear made from powdered metal. In either case, the various dies would be machined so that a gap rather than a tooth would occur at the desired locations.

Referring now to FIG. 3, there is a symbolic representation, in the form of a flow chart, illustrating a method of determining the direction of rotation of the output shaft 17, utilizing the rotor 27 of FIG. 2. In connection with the flow chart of FIG. 3, it should be understood that the symbol "T" represents time, and the symbol "N" represents teeth 29 on the rotor 27.

At operation block 39, the various counters, stored values, and clocks would all be "zeroed out" in preparation for beginning the execution of the system logic. At decision block 41, there is a measurement of the time period which passes from sensing one tooth to sensing the next tooth, each tooth being represented by a recognizable voltage wave form, transmitted to the system logic from the pick-up device 31 by the lead wires 35. The time period sensed is compared to the time period which has previously been sensed between the passage of two adjacent teeth within the same group of teeth, that time period being designated $\Delta T_N$. If the sensed time period is greater than 1.5 times $\Delta T_N$, thus indicating the passing of a gap 37, then the number (N) of teeth in the immediately following group of teeth is counted at an operation block 43. If the condition in the decision block 41 is not true, the logic will exit from that point and re-enter, upstream of the decision block 41, and start over measuring the time until the passage of the next tooth. The teeth are counted (N is incremented) until the next gap is sensed at a decision block 45. When the condition in the decision block 45 is true, indicating the presence of a gap, the logic proceeds to an operation block 47 in which the number N1 is set equal to the then-current value of N.

After counting the number N1 of teeth in that particular group, the number N1 of teeth counted is compared at a decision block 49 to the number "3", because there are less than three teeth in each of groups A and B, but more than three teeth in group C. If N1 is greater than 3 (indicating that group C has passed), the logic will exit and re-enter again just ahead of the decision block 41. If the number N1 is less than 3, then the counted value of the number N1 is stored at the operation block 50 and a new count of teeth is started at an operation block 51. When the next gap is sensed at a decision block 52, the number N2 is set equal to the then-current value of N. In the same manner, and for the same reason as was done previously, the number N2 is compared to the number "3" at a decision block 54. If N2 is greater than 3, the logic will exit and re-enter again just ahead of the decision block 41. If the number N2 is less than 3, the logic proceeds to operation block 55, which stores the number N2.

After the number of teeth N2 has been stored at operation block 55, the numbers N2 and N1 are compared at a decision block 57, and if N2 is greater than N1, the logic will proceed to an operation block 59, which will generate a signal 61, representative of clockwise rotation of the shaft 17. If number N2 is not greater than the number N1, the logic exits and re-enters at an operation block 63, which generates a signal 65, representative of counter-clockwise rotation of the shaft 17.

It is believed that the use and implementation of a logic flow chart in connection with a vehicle transmission, and in conjunction with a central processing unit, may be better understood by reference to U.S. Pat. No. 4,361,060, incorporated herein by reference, and by reference to U.S. Pat. No. 4,595,986, assigned to the assignee of the present invention, and also incorporated herein by reference.

Those skilled in the art will understand that it is normally preferred to utilize a rotor 27 having a greater number of rotor exciter surfaces (teeth 29) in order to increase the sensitivity of the speed sensing portion of the overall system. For example, a typical number of teeth which would be used on the rotor 27 would be sixty. In that case, in the embodiment of FIGS. 2 and 3, there would be one tooth in group A, two teeth in group B, and 54 teeth in group C. However, those skilled in the art will also understand that the method illustrated in FIG. 3 could be practiced with groups A and B having different numbers of teeth than 1 and 2, but preferably the number of teeth in group C would be substantially greater than the number of teeth in groups A and B.

EMBODIMENT OF FIGS. 4 AND 5

Figure 4:
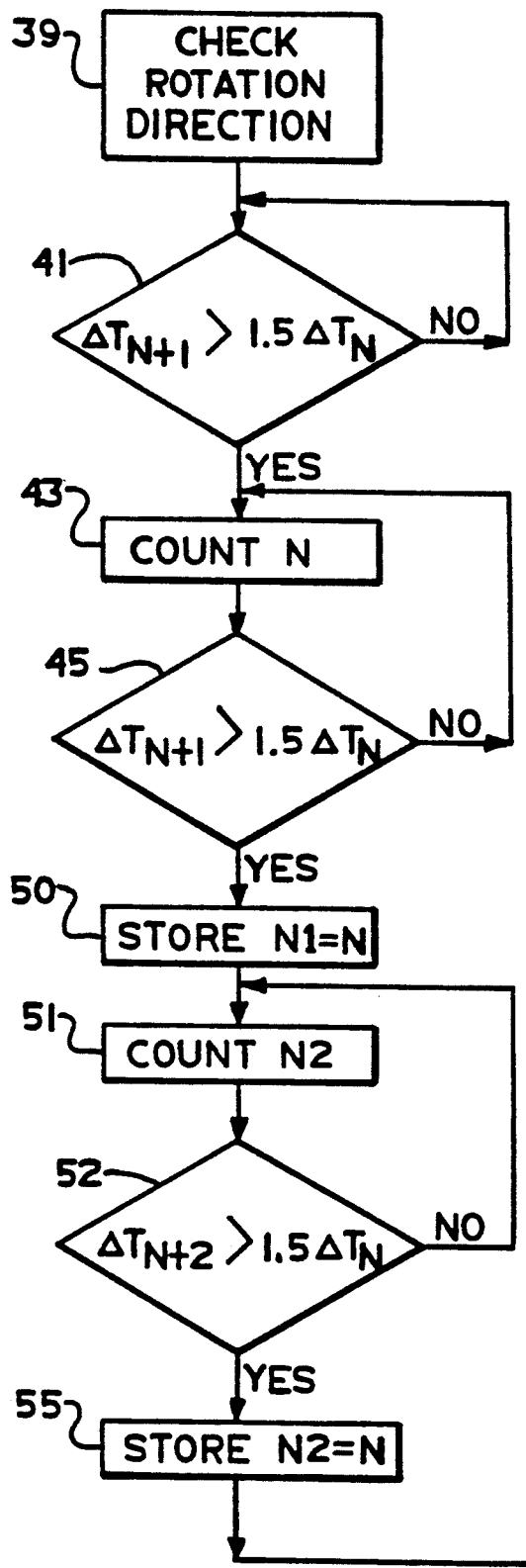
FIG. 4 is a view similar to FIG. 2, illustrating an alternative embodiment of the rotor.
Figure 4:
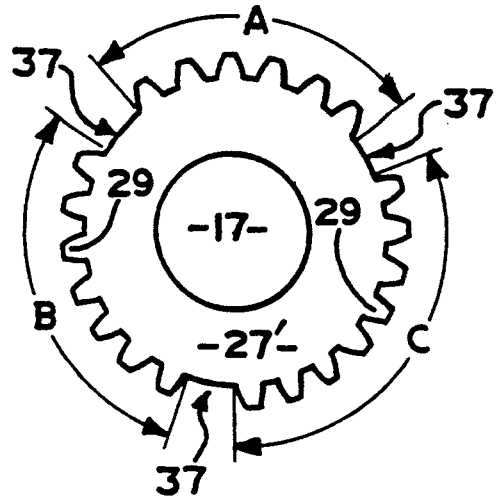
Figure 5:
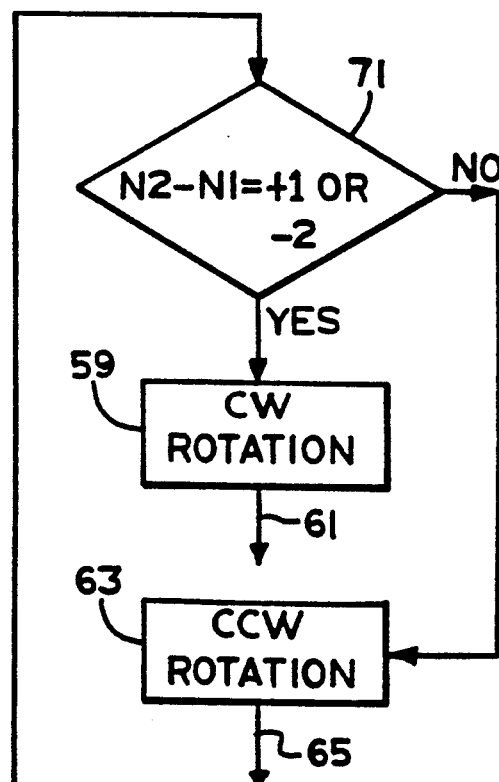
FIG. 5 is a flow chart illustrating the embodiment of the method to be used in conjunction with the rotor of FIG. 4.

Referring now to FIGS. 4 and 5, there will be illustrated an alternative embodiment of the invention. In FIG. 4, in the rotor 27', there are again three groups of teeth designated A, B, and C. In the embodiment of FIG. 4, there are six teeth in group A, seven teeth in group B, and eight teeth in group C. Again, as in FIG. 2, each group of teeth is separated by a gap 37, each of which preferably represents a tooth which has been eliminated.

Referring now to FIG. 5, the flow chart illustrated therein is generally similar to that shown in FIG. 3, and the various symbols have the same meanings as in FIG. 3. Each element in FIG. 5 which is the same as in FIG. 3 will bear the same reference numeral, with any new elements bearing reference numerals in excess of "70".

The flow chart again starts at the operation block 39, then proceeds to the decision block 41. If the sensed time period indicates the passing of a gap 37, then the number N of teeth in the immediately following group of teeth is counted at the operation block 43. If the condition in the decision block 41 is not true, the logic will exit from that point and re-enter, upstream of the decision block 41.

After counting the number N of teeth in that particular group, the logic proceeds to the decision block 45, which again measures the time period until the passing of the next tooth. If the time period measured indicates the passing of the next gap 37, the number N1 is set equal to the then-current value of N at the operation block 50, and the logic proceeds to the operation block 51, which counts the number N of teeth in the next group. Next, the decision block 52 senses the passage of time until the next tooth and if the time period indicates the passing of the next gap 37, the logic proceeds to set the number N2 equal to the then-current value of the number N in the operation block 55.

After both numbers N1 and N2 have been stored, the logic proceeds to a decision block 71. It should be noted that the logic of FIG. 5 differs from that of FIG. 3 in that the logic of FIG. 3 forced a comparison between the number of teeth in groups A and B only, by making sure that the larger number of teeth in group C would never be counted as either the number N1 or the number N2. By way of contrast, in the logic of FIG. 5, the number of teeth in any of the groups A, B, or C can be either N1 or N2, and the direction of rotation is determined as follows: Referring again to FIG. 4, if the rotor 27' is rotating clockwise, then the "increment" (i.e., the change in the number of teeth) in progressing from group A to group B to group C and then to group A again will be either +1 (from A to B or from B to C), or −2 (from C to A). If the rotor 27' is rotating counter-clockwise, the increment in progressing from one group to the next will be either −1 (from C to B, or B to A), or +2 (from A to C). With this information predetermined, based upon knowing the number of teeth in each group, the decision block 71 subtracts N1 from N2, and if the result is +1 or −2, the logic then proceeds to the operation block 59, which generates the signal 61 representative of clockwise rotation. If the result of the substraction in the decision block 71 is not +1 or −2, the logic exits and re-enters at the operation block 63, which generates the signal 65 representative of counter-clockwise rotation.

It may be seen in regard to the decision block 71 that the term "increment" does not necessarily mean "increase". In fact, for any rotor 27' having three groups of teeth in which the number of teeth in each group is different, the increment from one group of teeth to the next will be either +X and −Y (for clockwise rotation) or −X and +Y (for counter-clockwise rotation).

If it were desired to have a greater number of teeth on the rotor 27', for greater sensitivity to speed sensing, as was previously discussed, a sixty tooth rotor could be provided in which there would be fifteen teeth in group A, eighteen teeth in group B, and 21 teeth in group C. It should be understood, however that, with the present invention, it is not necessary that there be a uniform difference in the number of teeth, from one group to the next, nor is it necessary to have the number of teeth increase from group to group as the shaft rotates in one direction.

EMBODIMENT OF FIGS. 6 AND 7

Referring now to FIGS. 6 and 7, which illustrate another alternative embodiment, FIG. 6 illustrates a rotor 27'' on which the teeth 29 are separated into only two groups of teeth, the groups being designated A and B. In the embodiment of FIG. 6, there are nine teeth in group A and twelve teeth in group B. The groups A and B are separated by a gap 37, which again merely represents one tooth which has been eliminated, but the groups A and B are also separated by a gap 73, which represents two teeth which have been eliminated. Therefore, the nine teeth in group A, the twelve teeth in group B, the one tooth in gap 37, and the two teeth in gap 73 account for all twenty-four of the nominal teeth.

Referring now to FIG. 7, the logic again starts with the operation block 39, then proceeds to a decision block 75, where there is a measurement of the time period which passes from sensing one tooth to sensing the next tooth, indicating that the gap 73 has just been sensed. However, in the decision block 75, only if the sensed time period is greater than 2.5 times $\Delta T_N$ does the logic proceed. Otherwise, the logic exits from that point and re-enters upstream of the decision block 75, and starts over. If the condition in the decision block 75 is true, the logic then proceeds to count the number N of teeth in the immediately following group of teeth, at the operation block 43.

The logic then proceeds to the decision block 47, which measures the time period until the passing of the next tooth. If that time period is greater than 1.5 times $\Delta T_N$, indicating that the gap 37 has just been sensed, then the number N1 is set equal to the counted value of the number N at the operation block 49. If not, the logic is exited and re-entered above the operation block 43.

After storing the number N1, the logic proceeds to the operation block 51, which counts the number N of teeth in the next group. The logic then proceeds to a decision block 77, which again senses the larger gap 73. If the condition in the decision block 77 is true, the logic proceeds to an operation block 78 at which the number N2 is set equal to the counted value of the number N, and the logic then proceeds to a decision block 79 at which the numbers N1 and N2 are compared. As a result of the use of the two different-sized gaps 37 and 73, and the two groups of teeth A and B, it is known that if the rotor 27" is rotating clockwise, the teeth in group B will be sensed immediately after the gap 73 is sensed by the decision block 75, and therefore, N1 will be equal to 12 and N2 will be 9. The condition in the decision block 79 will be true, and the logic will proceed to the operation block 59 which will generate the signal 61, representing clockwise rotation. If the rotor 27" is rotating counter-clockwise, the teeth in group A will be counted immediately after the gap 73 is sensed, and therefore N1 will be 9 and N2 will be 12, and the condition in the decision block 79 will not be true. In that case, the logic will exit to the operation block 63, which will generate the signal 65, representative of counter-clockwise rotation.

If, in connection with the embodiment of FIGS. 6 and 7, it were desired to use a sixty-tooth rotor 27", for the reasons discussed previously, there could be twenty seven teeth in group A and thirty teeth in group B, although those skilled in the art will understand that various other combinations of numbers of teeth could be utilized.

EMBODIMENT OF FIGS. 4 AND 8

Figure 8:
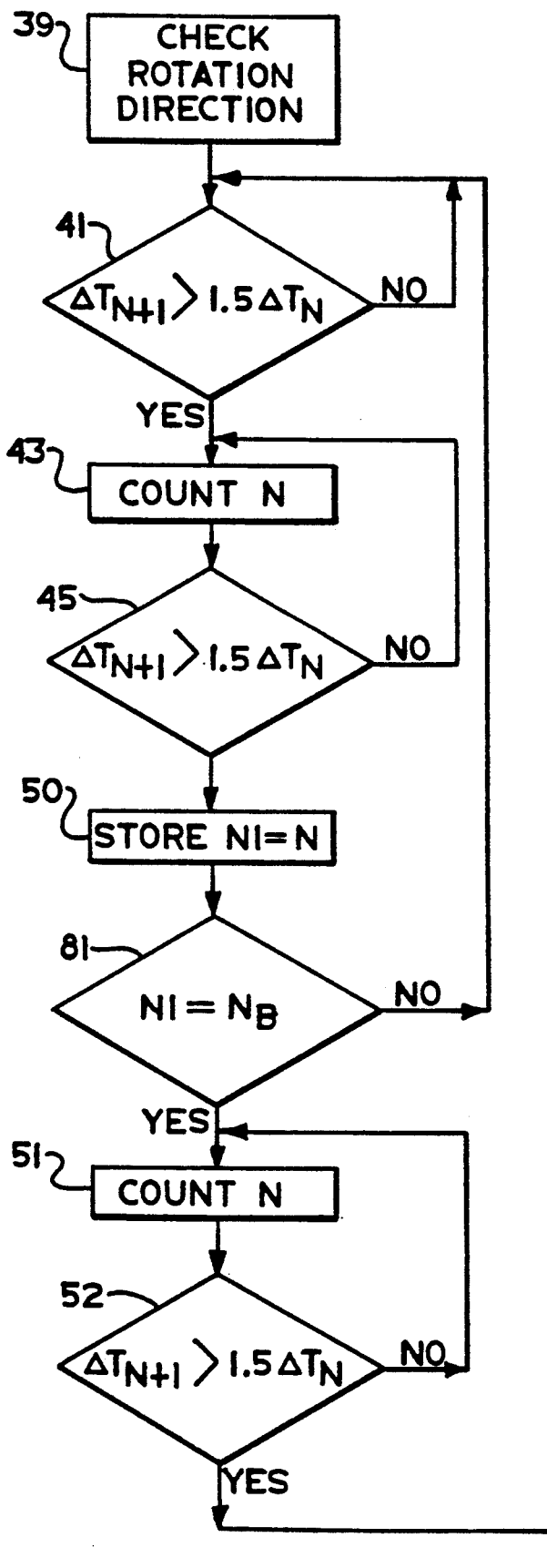
FIG. 8 is a flow chart illustrating an alternative embodiment of the method to be used in conjunction with the rotary in FIG. 4.
Figure 8:
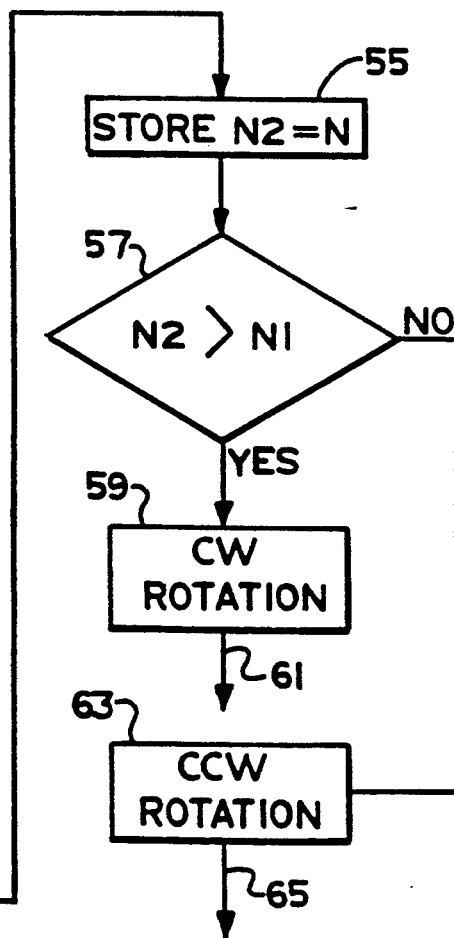

Referring now to FIGS. 4 and 8, there will be illustrated an alternative embodiment of the method to be used in connection with the rotor shown in FIG. 4. Each element in FIG. 8 is the same as in the method shown in FIG. 5 will bear the same reference number, with any new elements bearing reference numbers in excess of "80".

As described previously in FIG. 4, there are six of the teeth in the group A ($N_A=6$); seven of the teeth in group B ($N_B=7$); and 8 of the teeth in group C ($N_C=8$). Therefore, $N_B$ is greater than $N_A$, but less than $N_C$, and this relationship will be utilized in the logic of FIG. 8.

Referring now primarily to FIG. 8, the logic starts, as in the other embodiments, with the operation block 39, then proceeds to the decision block 41. If the sensed time period indicates the passage of a gap 37, then the number N of teeth in the immediately following group of teeth is counted at the operation block 43. After each tooth is counted, the time until the passing of the next tooth is compared at the decision block 45, until there is an indication of the passing of another gap 37. When the next gap 37 is sensed, the number N1 is set equal to the then-current value of the number N at the operation block 50. Subsequently, the number N1 is compared to $N_B$ at a decision block 81. If the condition at the decision block is not true, the logic exits and re-enters above looking for the next gap 37. If the condition at the decision block 81 is true, then the number of teeth in the next group of teeth is counted at the operation block 51, the count continuing until the indication of the passing of another gap at the decision block 52. When the next gap is found, the number N2 is set equal to the then-current value of the number N at the operation block 55. Next, the number N2 is compared to the number N1, and if greater, the logic proceeds to the operation block 59, which will generate the signal 61 representative of clockwise rotation. If the number N2 is less than the number N1 (the condition at the decision block 57 is not true), the logic exits and re-enters at the operation block 63, which generates the signal 65, representative of counter-clockwise rotation.

EMBODIMENT OF FIGS. 6 AND 9

Figure 9:
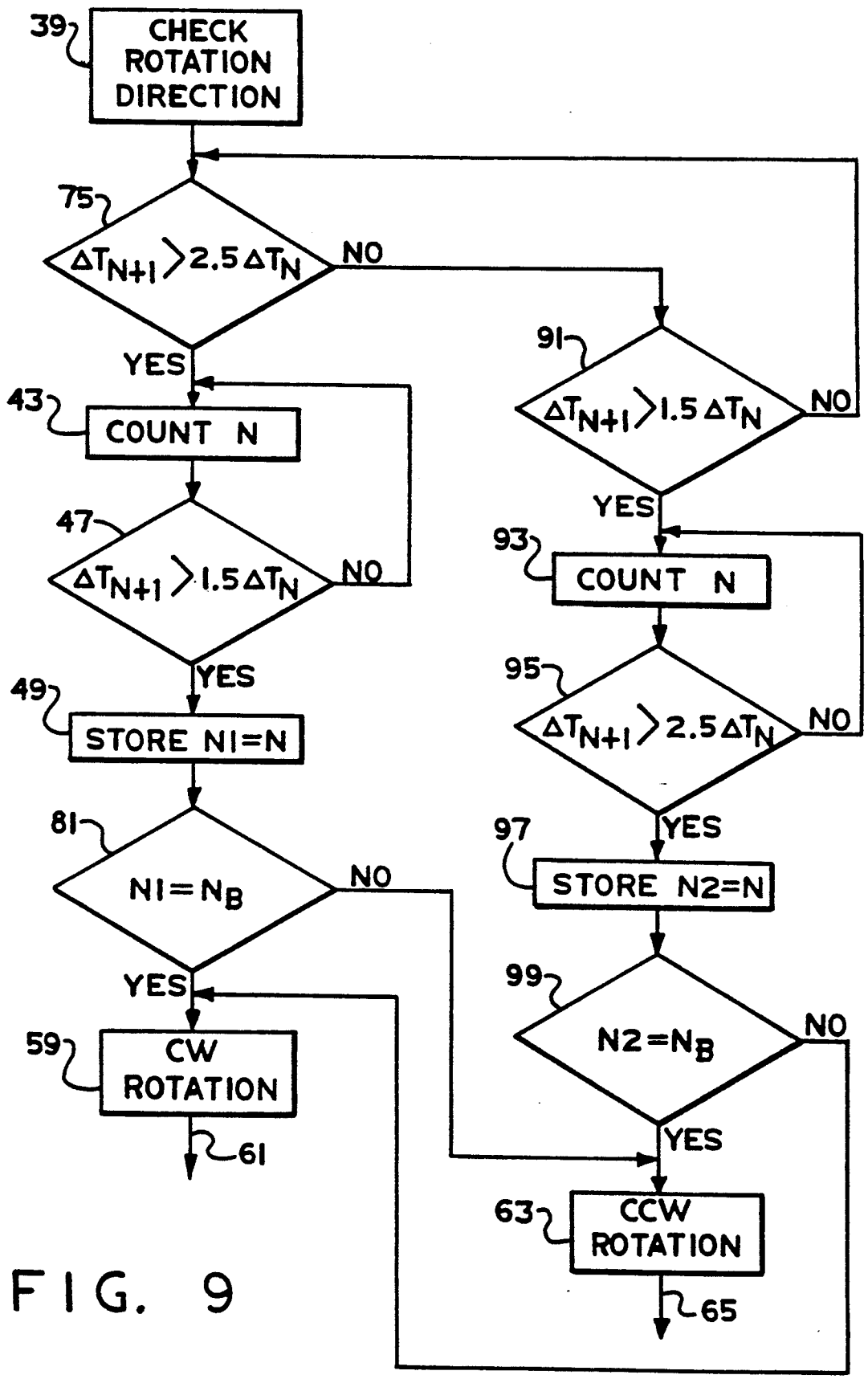
FIG. 9 is a flow chart illustrating an alternative embodiment of the method to be used in conjunction with the rotor of FIG. 6.

Referring now to FIG. 9, there is illustrated an alternative embodiment of the method used in connection with the rotor of FIG. 6. Each element in FIG. 9 which is the same as in one of the preceding embodiments will bear the same reference number, with any new elements bearing reference numerals in excess of "90".

The logic starts at the operation block 39, then proceeds to the decision block 75, which checks to see if the time period which passes from sensing one tooth to sensing the next tooth indicates that the gap 73 has just been sensed. If the condition in the decision block 75 is true, the logic continues to count the number N of teeth in the immediately following group of teeth at the operation block 43. The teeth are counted until gap 37 is sensed at the decision block 47, after which the number N1 is set equal to the then-current value of the number N, and at the decision block 81, the number N1 is compared to the number $N_B$ (the number of teeth in group B on the rotor of FIG. 6). If N1 is equal to $N_B$, immediately after sensing the passing of the gap 73, the condition in the decision block 81 is true, and the logic proceeds to the operation block 59, which generates the signal 61 representative of clockwise rotation. If the condition at the decision block 81 is not true, the logic exits and re-enters the parallel logic path at a point to be described subsequently.

If the condition at the decision block 75 is not true, the logic exits and goes to a parallel logic path which begins with a decision block 91 which senses the passing of time to see if the gap 37 has been sensed. At the decision block 91, the passing of the smaller gap 37 is sensed, and if the condition is true, the logic continues by counting the number N of teeth in the next group of teeth, at an operation block 93, the count continuing until the passing of the large gap 73 is sensed at a decision block 95. When the condition at the decision block 95 is true, indicating the passing of the gap 73, the number N2 is set equal to the then-current value of the number N at an operation block 97. Next, the number N2 is compared to the number $N_B$ at a decision block 99. If the condition is not true, the logic exits and re-enters the other parallel logic path upstream of the operation block 59 to generate the clockwise signal 61. If the condition at the decision block 99 is true, or if the condition at the decision block 81 is not true, the logic proceeds to the operation block 63, generating the counter-clockwise signal 65.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A method of determining the direction of rotation of a member having a speed pick-up rotor associated therewith, said rotor being of the type provided with a plurality of circumferentially spaced-apart rotor exciter surfaces adapted to be sensed by a sensor assembly of the type adapted to generate a predetermined signal in response to the proximal passing of a rotor exciter surface, the method comprising the steps of:
   (a) providing said pick-up rotor with a predetermined pattern of gaps and groups of said exciter surfaces, each group of exciter surfaces having a number of exciter surfaces which is different than the number in any other group;
   (b) sensing, as the rotor rotates, the passing of one of said gaps, and comparing said one gap to a known gap to determine the existence of equality or inequality between said one gap and known gap;
   (c) sensing, as the rotor rotates, the passing of each exciter surface within at least the one group immediately following the sensed gap, and counting the number N of said exciter surfaces within said group;
   (d) comparing the sensed pattern of said one gap and said exciter surfaces to said predetermined pattern, and, if said patterns are the same, generating a first signal representative of clockwise rotation of said member, and, if said patterns are not the same, generating a signal representative of counter-clockwise rotation of said member.

2. A method as claimed in claim 1, characterized by said rotor comprising three groups of said exciter surfaces.

3. A method as claimed in claim 2, characterized by said three groups of said exciter surfaces being separated by three substantially equal gaps.

4. A method as claimed in claim 1, characterized by said method further comprising the steps of sensing and counting the passing of each exciter surface within said one group immediately following the sensed gap; sensing the gap after said one group of exciter surfaces; and sensing and counting the passing of each exciter surface within the immediately subsequent group of exciter surfaces.

5. A method as claimed in claim 1, characterized by said rotor comprising two groups of said exciter surfaces, being separated by first and second gaps, said second gap having a substantially greater circumferential extent than said first gap.

6. A method claimed in claim 1, characterized by step (b) comprising the step of sensing the passing of said second gap.

7. A method claimed in claim 6, characterized by said step (b) further comprising the steps of sensing and counting the passing of each exciter surface within said one group immediately following said second gap; sensing said first gap; and sensing and counting the passing of each exciter surface within the group of exciter surfaces immediately following said first gap.

8. A method claimed in claim 1, characterized by said rotor comprising three groups of said exciter surfaces, said three groups each having a different number of said exciter surfaces, and said step comprises the step of sensing and counting the pattern of the number of exciter surfaces in said three groups; and said step comprises the step of comparing said sensed pattern of exciter surfaces to a predetermined pattern comprising said numbers.

9. A method of determining the direction of rotation of a member having a speed pick-up rotor associated therewith, said rotor being of the type provided with a plurality of circumferentially spaced-apart rotor exciter surfaces adapted to be sensed by a sensor assembly of the type adapted to generate a predetermined signal in response to the proximal passing of a rotor exciter surface, the method comprising the steps of:
   (a) providing said speed pick-up rotor with a pattern of said exciter surfaces in which there are at least three groups of said exciter surfaces, each group of exciter surfaces being separated by a gap having a different circumferential extent than that between adjacent exciter surfaces within each of said groups, each group of exciter surfaces having a number of exciter surfaces which is different than the number in any other group;
   (b) sensing, as said rotor rotates, the passing of each exciter surface within one group of exciter surfaces, and counting the number N of said exciter surfaces within said one group, and if the number N is not equal to said number $N_c$, storing the number N as N1;
   (c) sensing the passing of each exciter surface within another group of exciter surfaces, and counting the number N of said exciter surfaces within said another group, and if the number N is not equal to said number $N_c$, storing the number N as N2; and,
   (d) comparing said numbers N1 and N2, and if N2 is greater than N1, generating a first signal representative of clockwise rotation of said member, and if N1 is greater than N2, generating a second signal representative of counter-clockwise rotation of said member.

10. A method as claimed in claim 9, characterized by said number of exciter surfaces is a relatively large number, and said numbers of exciter surfaces are relatively small numbers.

11. A method of determining the direction of rotation of a member having a speed pick-up rotor associated therewith, said rotor being of the type provided with a plurality of circumferentially spaced-apart rotor exciter surfaces adapted to be sensed by a sensor assembly of the type adapted to generate a predetermined signal in response to the proximal passing of a rotor exciter surface, the method comprising the steps of:
   (a) providing said speed pick-up rotor with a pattern of said exciter surfaces in which there are at least three groups of said exciter surfaces, each group of exciter surfaces being separated by a gap having a greater circumferential extent than that between adjacent exciter surfaces within each of said groups, each group of exciter surfaces having a number of exciter surfaces which is different than the number in any other group;
   (b) sensing, as said rotor rotates, the passing of each exciter surface, and generating said signal in response thereto; and sensing the passing of each gap;
   (c) counting a first number N1 of signals between successive gaps corresponding to a first group of exciter surfaces, then counting a second number N2 of signals between the next successive gaps, corresponding to the next successive group of exciter surfaces;

(d) calculating the increment I in the number of signals in proceeding from said first group to said next successive group of exciter surfaces, wherein:

$I = N2 - N1$; and (e) comparing said increment I to logic means including, for each possible value of said increment I, a corresponding signal representative of direction of rotation.

12. A method as claimed in claim 11, characterized by said speed pick-up rotor comprises a gear member, each of said exciter surfaces comprises a gear tooth, and each of said gaps corresponds to a missing gear tooth.

13. A method as claimed in claim 11, characterized by said step of comparing said increment I to said logic means comprises searching a look-up table wherein, if said increment I is equal to $+X$ or $-Y$, the direction of rotation of said member is clockwise, and if said increment I is equal to $-X$ or $+Y$, the direction of rotation of said member is counter-clockwise.

14. A method of determining the direction of rotation of a member having a speed pick-up rotor associated therewith, said rotor being of the type provided with a plurality of circumferentially spaced-apart rotor exciter surfaces adapted to be sensed by a sensor assembly of the type adapted to generate a predetermined signal in response to the proximal passing of a rotor exciter surface, the method comprising the steps of:

(a) providing said speed pick-up rotor with a pattern of said exciter surfaces in which there are at least two groups of said exciter surfaces, said groups of exciter surfaces being separated by first and second gaps having different circumferential extents than that between adjacent exciter surfaces within each of said groups, and different circumferential extents than each other, the two groups of exciter surfaces having numbers of exciter surfaces which are different than each other;

(b) sensing, as said rotor rotates, the passing of said first gap, then counting the number N of said exciter surfaces within the one of said groups immediately following said first gap and storing the number N as N1;

(c) sensing the passing of said second gap, then counting the number N of said exciter surfaces within the one of said groups immediately following said second gap and storing the number N as N2; and, (d) comparing said numbers N2 and N1, and if N2 is less than N1, generating a first signal representative of clockwise rotation of said member, and if N2 is greater than N1, generating a second signal representative of counter-clockwise rotation of said member.

15. A method as claimed in claim 14, characterized by said speed pick-up rotor comprising a gear member, each of said exciter surfaces comprising a gear tooth, said first gap corresponding to two missing gear teeth, and said second gap corresponding to one missing gear tooth.

* * * * *